(12) United States Patent
Blodgett et al.

(10) Patent No.: US 11,981,207 B1
(45) Date of Patent: May 14, 2024

(54) RECONFIGURABLE DISPLAY SYSTEM AND METHOD OF CONTROL THEREOF

(71) Applicant: GM GLOBAL TECHNOLOGY OPERATIONS LLC, Detroit, MI (US)

(72) Inventors: Matthew Blodgett, Tarboro, NC (US); Dustin H. M. Smith, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/315,816

(22) Filed: May 11, 2023

(51) Int. Cl.
| | |
|---|---|
| *B60K 35/00* | (2024.01) |
| *B60K 35/23* | (2024.01) |
| *B60K 35/28* | (2024.01) |
| *B60K 35/29* | (2024.01) |
| *G06F 3/01* | (2006.01) |
| *G06F 3/14* | (2006.01) |
| *G06T 3/20* | (2006.01) |
| *G06T 3/40* | (2024.01) |

(52) U.S. Cl.
CPC ............. *B60K 35/00* (2013.01); *G06F 3/013* (2013.01); *G06F 3/1423* (2013.01); *G06T 3/20* (2013.01); *G06T 3/40* (2013.01); *B60K 35/23* (2024.01); *B60K 35/28* (2024.01); *B60K 35/29* (2024.01); *B60K 2360/164* (2024.01); *B60K 2360/167* (2024.01); *B60K 2360/18* (2024.01); *G06T 2207/30268* (2013.01)

(58) Field of Classification Search
CPC ........ B60K 35/00; B60K 35/28; B60K 35/23; B60K 35/29; B60K 2360/18; B60K 2360/164; B60K 2360/167; G06F 3/1432; G06F 3/013; G06F 3/1423; G06T 3/20; G06T 3/40; G06T 2207/30268
USPC .................................... 345/157, 670
See application file for complete search history.

(56) References Cited

U.S. PATENT DOCUMENTS

| | | | | |
|---|---|---|---|---|
| 2008/0224840 A1* | 9/2008 | Kawachi | ............... | B60K 35/00 340/441 |
| 2013/0282240 A1* | 10/2013 | Nada | ..................... | B60K 35/00 701/42 |
| 2020/0105230 A1* | 4/2020 | Jung | ....................... | G06F 3/013 |

* cited by examiner

*Primary Examiner* — Jimmy H Nguyen
(74) *Attorney, Agent, or Firm* — Quinn IP Law (57) ABSTRACT

A method for presenting one or more images to an observer on a reconfigurable electronic display includes prompting the observer to select a portion of the display that is visible to the observer and, if the observer has selected a portion of the display, presenting the images to fit within the selected portion of the display. Subsequent to presenting the images to fit within the selected portion of the display and in response to at least partial obstruction of the observer's view of the images by a visual obstruction, the images are reconfigured to be fully visible to the observer notwithstanding the visual obstruction.

20 Claims, 7 Drawing Sheets

RECONFIGURABLE DISPLAY SYSTEM AND METHOD OF CONTROL THEREOF

INTRODUCTION

The present disclosure is in the field of electronic displays.

In a vehicle, a display may be provided forward of the vehicle operator. That display may be used to show a variety of information on indicators including vehicle speed, transmission gear status, fuel level, coolant temperature, and telltale lamps providing various warnings and advisories, including (among others) unfastened seat belt(s), low tire pressure, charging system malfunction, engine diagnostic advisory, and parking brake actuation. Various other information may be displayed as well.

In some vehicles, the vehicle operator's view of the display may be obscured by an obstruction, such as a steering wheel. A system that improves a vehicle operator's view of the display in such instances may be advantageous.

SUMMARY

Disclosed herein is a method for presenting one or more images to an observer on a reconfigurable electronic display. The method includes prompting the observer to select a portion of the display that is visible to the observer. If the observer has selected a portion of the display, the images are presented to fit within the selected portion of the display. The method additionally includes, subsequent to presenting the images to fit within the selected portion of the display and in response to at least partial obstruction of the observer's view of the images by a visual obstruction, reconfiguring the images to be fully visible to the observer notwithstanding the visual obstruction. As an enhancement, if the images cannot be reconfigured to be fully visible notwithstanding the visual obstruction, the images may be displayed on a second display, where the display is an instrument panel display of the vehicle and the second display is a heads-up display or a center stack display of the vehicle.

In an additional variation to the method disclosed herein, prompting the observer may include presenting a first pattern of polygons on the display and requesting the observer to select, from the first pattern of polygons, polygons that are fully visible to the observer. Prompting the observer may, in a variation, include providing the observer with a cursor and requesting the observer to identify, with the cursor, a portion of the display that is visible to the observer.

Prompting the observer may additionally include, if the observer has selected polygons from the first pattern of polygons, presenting a second pattern of polygons on the display, the polygons of the second pattern of polygons being smaller than the polygons of the first pattern of polygons and situated in a portion of the display not selected by the observer from the first pattern of polygons, and requesting the observer to select, from the second pattern of polygons, polygons that are fully visible to the observer.

In variations, reconfiguring the images includes resizing the images on the display or moving the images on the display. In additional variations, the observer is a driver of a motor vehicle and the visual obstruction is a steering wheel of the vehicle or a portion of the steering wheel.

The images may include at least one of an image of a speedometer of the motor vehicle, an image of a transmission gear indicator of the motor vehicle, an image of a fuel level gauge of the motor vehicle, an image of a coolant temperature gauge of the motor vehicle, and an image of a telltale indicator lamp of the motor vehicle.

In addition, a method for presenting one or more images to an observer on a reconfigurable electronic display is presented herein, the method including prompting the observer to select a portion of the display that is visible to the observer and, if the observer has selected a portion of the display, presenting the images to fit within the selected portion of the display. Subsequent to presenting the images to fit within the selected portion of the display, the method may include monitoring one or more of an eye position of the observer relative to the images and a position of an object generally located between the observer and the images to determine whether the object partially or wholly obstructs the observer's view of the images. If the object partially or wholly obstructs the observer's view of the images, the images are reconfigured to be fully visible to the observer.

In a variation, prompting the observer includes presenting a first pattern of polygons on the display and requesting the observer to select, from the first pattern of polygons, polygons that are fully visible to the observer.

In an additional variation, prompting the observer further includes, if the observer has selected polygons from the first pattern of polygons, presenting a second pattern of polygons on the display, the polygons of the second pattern of polygons being smaller than the polygons of the first pattern of polygons and situated in a portion of the display not selected by the observer from the first pattern of polygons, and requesting the observer to select, from the second pattern of polygons, polygons that are fully visible to the observer.

Also disclosed herein is a reconfigurable display system for displaying one or more images thereon. The system includes a reconfigurable electronic display and one or more electronic control units collectively programmed with the following instructions: prompt an observer to select a portion of the display that is visible to the observer; if the observer has selected a portion of the display, present the images to fit within the selected portion of the display; and subsequent to presenting the images to fit within the selected portion of the display and in response to at least partial obstruction of the observer's view of the images by a visual obstruction, reconfigure the images to be fully visible to the observer notwithstanding the visual obstruction.

In the reconfigurable display system the instruction to prompt the observer may further include the instructions to present a pattern of polygons on the display and request the observer to select, from the pattern of polygons, polygons that are fully visible to the observer.

In the reconfigurable display system, the observer may be a driver of a motor vehicle, the display may be an instrument panel display of the motor vehicle and the visual obstruction may be a steering wheel of the motor vehicle or a portion of the steering wheel of the motor vehicle. Further, reconfiguring the images may include resizing the images and/or moving the images.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
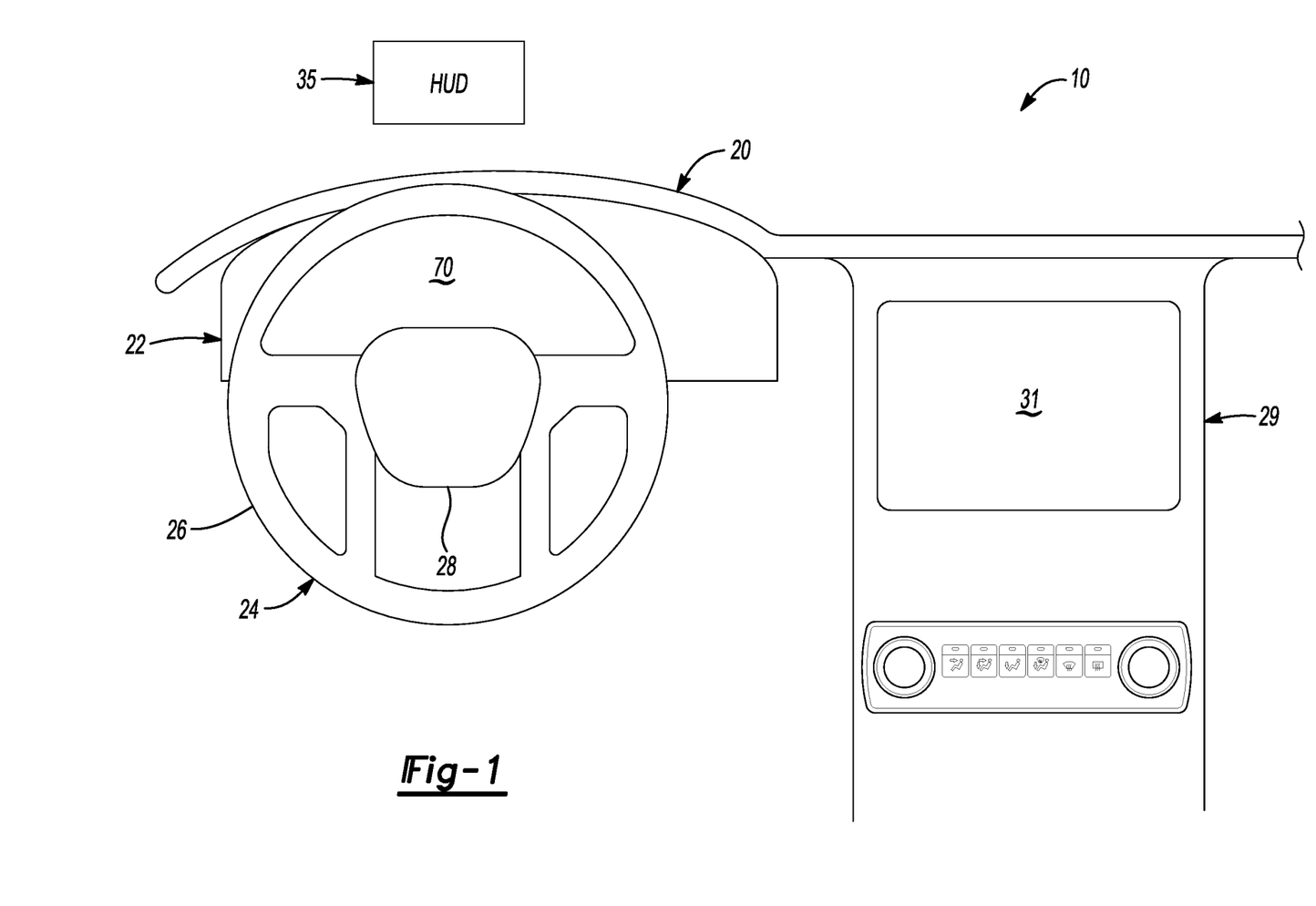
FIG. 1 is a view facing forward in an interior of a vehicle.

Referring to FIG. 1, an interior 10 of a motor vehicle includes a dashboard 20, an instrument panel display 22, and a steering wheel 24. Steering wheel 24 includes a rim 26 and a hub 28. Interior 10 of the motor vehicle may also include a center stack 29, which includes a center stack display 31, and a heads-up display ("HUD") 35 projected onto the windshield of the vehicle. A portion of instrument panel display 22 may be viewed through an aperture 70 between hub 28 and an upper portion of rim 26 of steering wheel 24.

Figure 2:
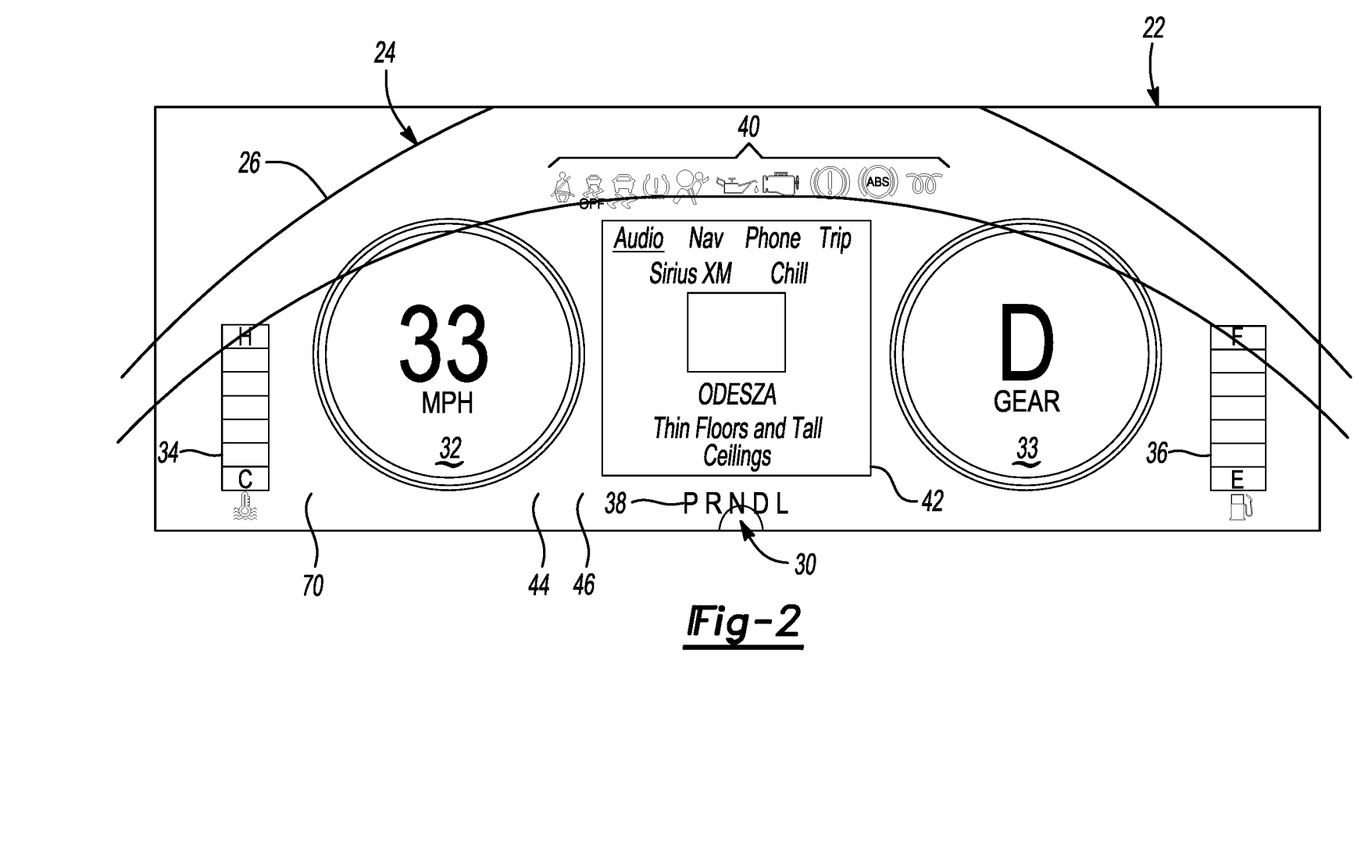
FIG. 2 shows an enlarged view of the instrument panel display of the vehicle.

With additional reference to FIG. 2, in this example disclosure instrument panel display 22 may be at least in part a reconfigurable electronic display, meaning that the various indicators shown on instrument panel display 22 may be images rather than physical gauges or lamps. Such indicators on instrument panel display 22 may include speedometer 32 (digital, as shown, or analog), transmission gear indicator 33, coolant temperature gauge 34, fuel level gauge 36, and transmission "PRNDL" gear indicator 38. The images also include images 40 of telltale lamps such as seat belt reminder, traction control "OFF" indicator, traction control actuated indicator, low tire pressure indicator, air bag diagnostic indicator, coolant level warning, charging system diagnostic indicator, low oil pressure indicator, check engine diagnostic indicator, parking brake indicator, anti-lock brake system diagnostic indicator, and glow plug indicator. Additionally, a portion in the center of instrument panel display 22 is an image 42 of a display of information for functions such as audio, navigation, phone, and radio. The various images 32, 33, 34, 36, 38, 40, and 42 will collectively be referred to herein as images 44 and their positions shown relative to one another will also be referred to herein as image field 46.

Figure 3:
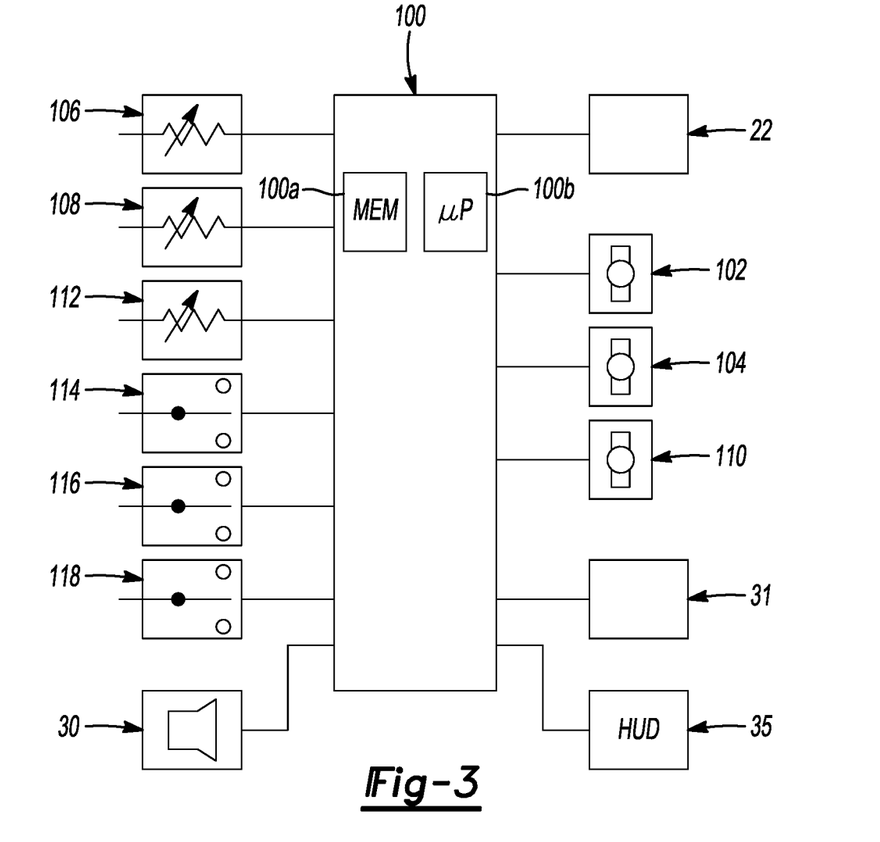
FIG. 3 is an electrical block diagram of electrical/electronic components described in this disclosure.

Referring additionally to FIG. 3, an electronic control unit ("ECU") 100 is provided to control instrument panel display 22, the position of steering wheel 24 and other features. Steering wheel 24 may be positioned up and down for the comfort and convenience of the driver via an up/down positioning motor 102. Steering wheel 24 may also be positioned fore and aft (that is, toward and away from the driver) via a fore/aft positioning motor 104. Position sensors 106 and 108 inform ECU 100 of the up/down and fore/aft positions of steering wheel 24, respectively. Alternatively or additionally, steering wheel 24 may be positioned via a tilt motor 110, which may tilt steering wheel 24 up and away from the driver or down and toward the driver (that is, rotation about a Y-axis that runs laterally relative to the vehicle). An associated tilt sensor 112 may tell ECU 100 the extent of tilt of steering wheel 24. Switches 114, 116, and 118 may provide driver commands to ECU 100 for fore/aft, up/down, and tilt adjustments. ECU 100 also includes as an input a camera 30 and as outputs center stack display 31 and heads-up display 35. Camera 30 is positioned to sense three-dimensional positions of one or both of the driver's eyes.

ECU 100 has the electronic resources (e.g., memory 100a, microprocessor 100b, inputs, outputs, and the like) sufficient to perform the tasks ascribed to ECU 100 in this disclosure. It may also be noted that modern motor vehicles may have distributed computing, with controllers that are extensively networked by data buses. Therefore, the functions ascribed in this disclosure to ECU 100 may be performed by or distributed among more than one electronic control unit, and inputs/outputs may be connected to any of them, with data and commands being shared among the electronic control units.

Steering wheel 24 defines an aperture 70 through which the driver of the vehicle may view instrument panel display 22. As illustrated in FIG. 2, however, the rim 26 of steering wheel 24 obscures the driver's vision of portions of the images for speedometer 32, transmission gear indicator 33, coolant temperature gauge 34, and fuel level gauge 36, and portions or all of several of telltale lamp images 40. Additionally, camera 30, provided to track the driver's eye positions, obscures a portion of PRNDL gear indicator 38. The positions of the images 44 as shown in FIG. 2 may be referred to as "design position", that is, a default position selected during design of the vehicle to accommodate a nominally-sized and positioned driver. However, the view as seen in FIG. 2 shows that with the images located in "design position," some of the images 44 are partially, substantially, or completely obscured by rim 26 of steering wheel 24 or by camera 30, by virtue of the driver's height, the driver's seating position, and/or the position of steering wheel 24.

Figure 4:
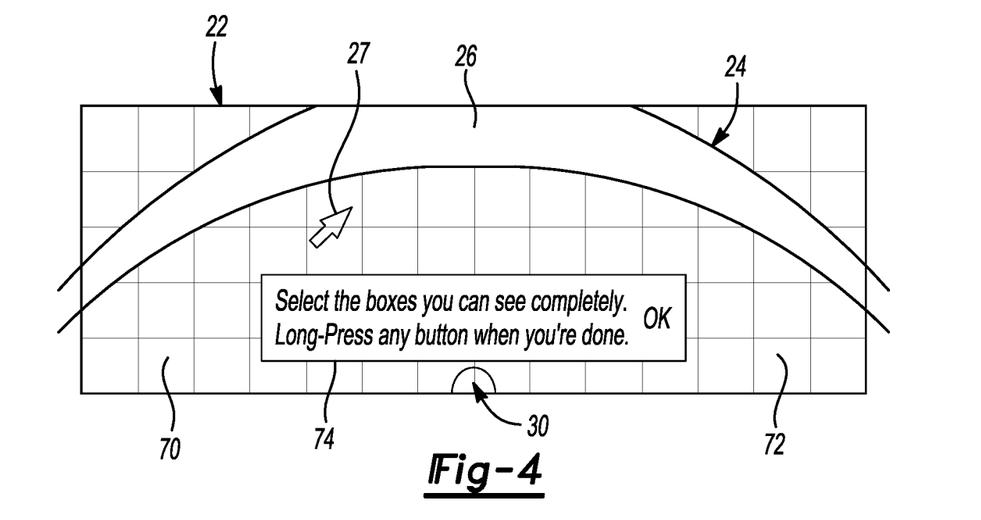
FIG. 4 illustrates a beginning of an initialization process for the instrument panel display.
Figure 5:
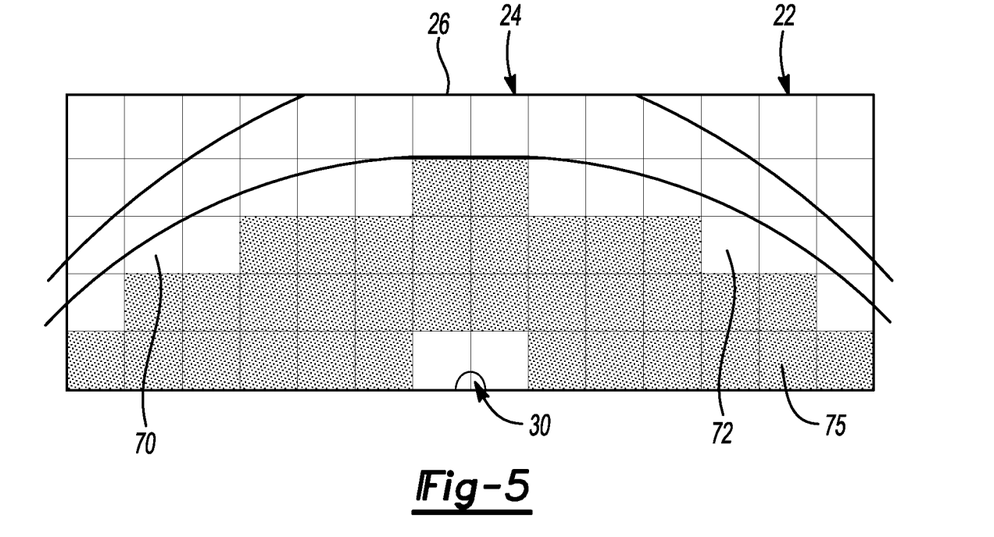
FIG. 5 further illustrates the initialization process for the instrument panel display.

In order to help overcome obstruction caused by, say, steering wheel 24 or camera 30, the driver may be offered the ability to initialize instrument panel display 22 to select the portion of instrument panel display 22 that the driver may see without or substantially without obstruction by steering wheel 24 or camera 30. This initialization begins with additional reference to FIG. 4. There, a grid pattern 72 may be displayed on instrument panel display 22 and the driver prompted to select the polygons (in this example in the shape of relatively square boxes) of grid pattern 72 that the driver may see completely or substantially completely through aperture 70. Such prompting may be by a message 74 on instrument panel display 22 or via a voice prompt by a voice generator in the vehicle. Instrument panel display 22 may be a touch screen display, and the driver may select boxes of grid pattern 72 by touching those boxes on instrument panel display 22. Alternatively, the driver may be given a cursor 27 by the user interface of the vehicle in order to select boxes of grid pattern 72; switches on steering wheel 24, on one or more of the stalks that may protrude from the steering column of the vehicle, on a multifunction controller, or otherwise provided in the vehicle may be used to manipulate cursor 27. The result is shown with additional reference to FIG. 5, where the shaded portion 75 illustrates the boxes that were selected by the driver. Sizing the image field 46 on instrument panel display 22 to fit within shaded portion 75 of instrument panel display 22 would mean that all of the images 44 would be fully or substantially fully visible to the driver without obstruction from, say, rim 26 or hub 28 of steering wheel 24 or camera 30.

Figure 6:
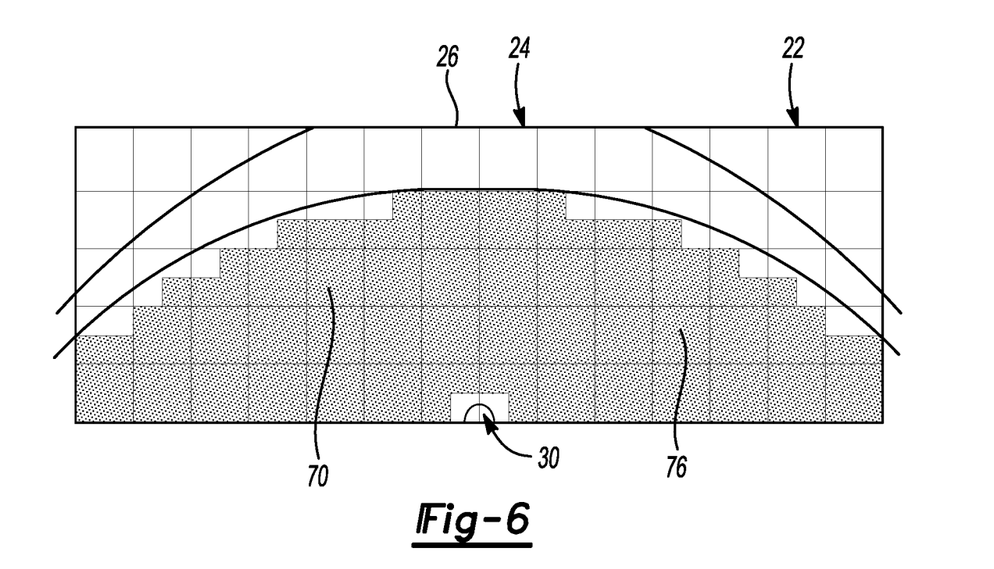
FIG. 6 yet further illustrates the initialization process for the instrument panel display.

However, the initialization process detailed in the previous paragraph may be made finer. As may be seen in FIG. 5, a substantial amount of area within aperture 70 was not selected, because the unselected boxes were at least partially obscured when the driver was prompted to select boxes that the driver could see completely. So, the initialization may undergo an additional step. Here, the unselected boxes may each be subdivided into four smaller boxes. The driver is then prompted once again to select the boxes among the smaller boxes that the driver can see completely. The result of this finer initialization is shown in FIG. 6, where the boxes selected from either the first or second step of the initialization are shown as shaded portion 76 of instrument panel display 22. Selecting among the smaller boxes allows a finer initialization, one that leaves less of instrument panel display 22 unselected and, conversely, more of instrument panel display 22 available for displaying images 44 without obstruction by rim 26 or hub 28 of steering wheel 24 or by camera 30.

As an alternative initialization process, the driver may be offered via the user interface of the vehicle to drag cursor 27 around the boundary of an area on instrument panel display 22 that the driver can see without obstruction through aperture 70. Alternatively yet, the user interface may allow the driver to drag cursor 27 that the driver can create a shape, such as a rectangle or an ellipse, on instrument panel display 22 that the driver can see without obstruction through aperture 70. Yet further, the user interface may allow the driver to use cursor 27 as a "flashlight" to point to areas of instrument panel display 22 that the driver can see without obstruction through aperture 70. The driver may also select visible portions of instrument panel display 22 using a multifunction controller that may be provided as part of the user interface of the vehicle.

Figure 7:
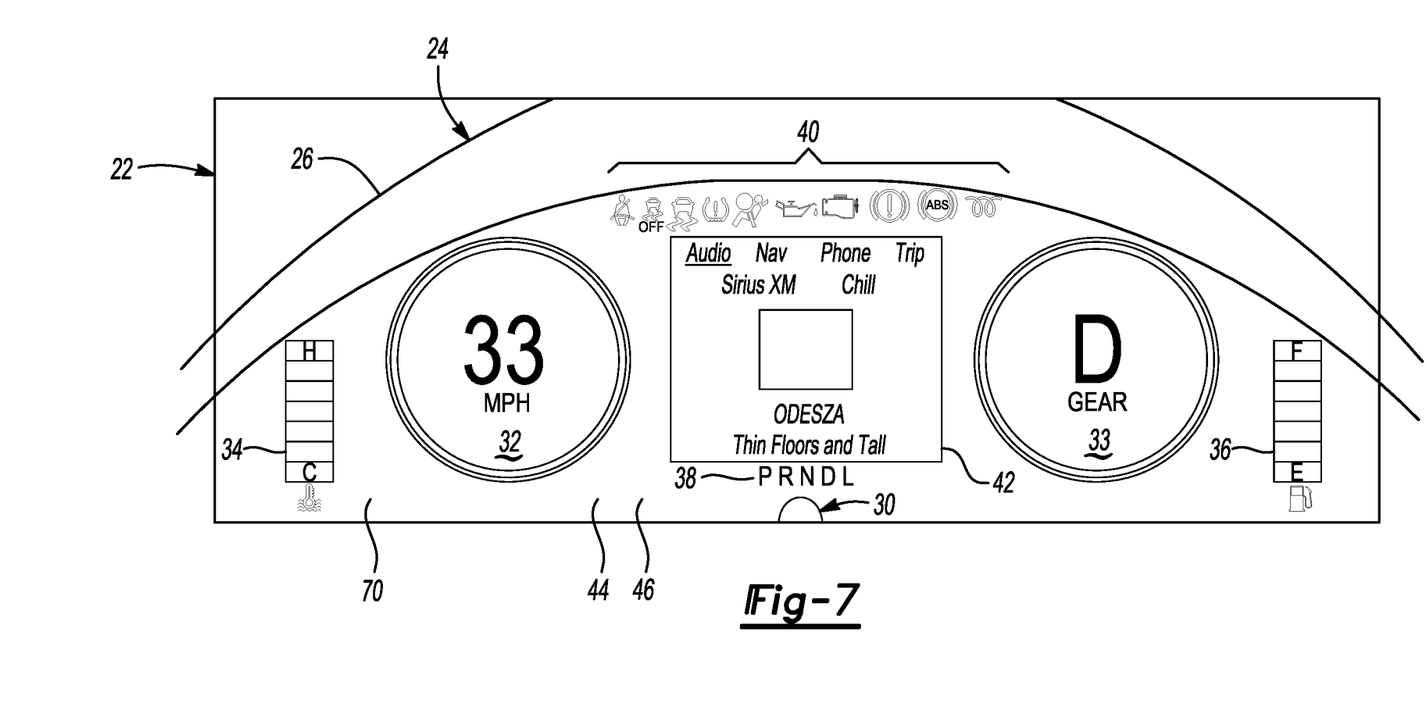
FIG. 7 includes an illustration of the instrument panel display at the end of the initialization process.

After the driver has finished selecting fully-visible boxes on instrument panel display 22, image field 46 on instrument panel display 22 may be resized and/or repositioned in order to fully fit with aperture 70 as viewed by the driver, without obstruction from steering wheel 24 or from camera 30. The result is shown with additional reference to FIG. 7. The system is now initialized. Such an initialization process may occur every time the vehicle is turned on, at predetermined intervals, upon predetermined conditions, or upon demand by the driver.

However, when driving the vehicle, conditions that impact the driver's ability to see images 44 on instrument panel display 22 may not necessarily remain static. For instance, the driver may shift to the left or to the right in the driver's seat. Or, the driver may adjust the driver's seat to be closer to or farther from instrument panel display 22 or to be higher or lower. Alternatively, the driver may adjust steering wheel 24 upward or downward. Alternatively, the driver may adjust steering wheel 24 fore or aft. Still further, the driver may tilt steering wheel 24 upward or downward.

If the driver's eyes move to the left, images 44 as viewed by the driver will tend to shift to the left relative to aperture 70 of steering wheel 24. Accordingly, the system of this example disclosure may shift some or all of images 44 or image field 46 as a whole to the right in order to coincide in the driver's field of vision with aperture 70 and not be obstructed by steering wheel 24. Movement of the driver's eyes to the left as described here would be sensed by camera 30.

Figure 8:
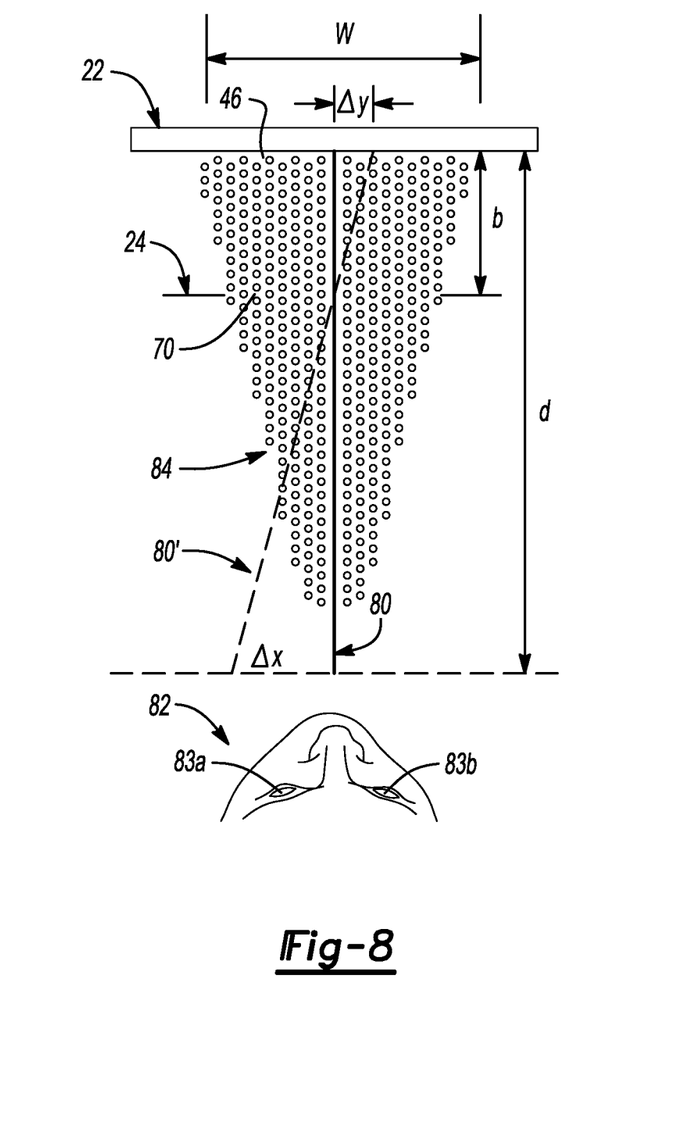
FIG. 8 shows a top view of a vehicle operator viewing the instrument panel display if the vehicle operator's eyes have moved to the left.

Additionally with reference to FIG. 8, such movement of driver 82's eyes 83a and 83b to the left and subsequent adjustment of images 44 or image field 46 is illustrated. Illustrated there is the line of sight 80 of driver 82 and driver 82's field of view 84 through aperture 70 of steering wheel 24, as initialized per the description above. The width of image field 46 is designated as W. If, then, driver 82's eyes 83a and 83b shift to the left by a distance Δx, driver 82's relocated line of sight through the center of aperture 70 is represented by 80'. Thus, the center of image field 46 may be shifted by a distance Δy to the right so that driver 82's relocated line of sight 80' through the center of aperture 70 will be located in the center of image field 46. If b denotes the distance of steering wheel 24 from instrument panel display 22 and d denotes the distance of driver 82's eyes 83a and 83b from instrument panel display 22, then the following equation holds true, due to the geometric principle of similar triangles:

$$\Delta y = \Delta x \frac{d}{d-b}$$

Δx and d are known quantities, because camera 30 tracks the position of driver 82's eyes 83a and 83b. b is also a known quantity because the fore-aft position of steering wheel 24 is tracked by position sensor 108. Thus, if driver 82's eyes 83a and 83b move a distance Δx to the left, then the system disclosed herein may shift some or all images 44 or image field 46 as a whole to the right by a distance Δy so that images 44 or image field 46 as a whole may be viewed through aperture 70 in steering wheel 24.

If driver 82's eyes 83a and 83b move to the right, images 44 as viewed by the driver will tend to shift to the right relative to aperture 70 of steering wheel 24. Accordingly, the system may shift some or all of images 44 or image field 46 as a whole to the left in order to coincide in driver 82's field of vision with aperture 70 (as viewed by the driver) and not be obstructed by steering wheel 24 or camera 30. The geometric principles described in the preceding paragraph will be applicable here as well to calculate the appropriate amount of shift of some or all of images 44 or image field 46 as a whole.

If driver 82's eyes 83a and 83b move higher, images 44 as viewed by the driver will tend to shift up relative to aperture 70 of steering wheel 24. Accordingly, the system may shift some or all of images 44 or image field 46 as a whole downward in order to coincide in driver 82's field of vision with aperture 70 (as viewed by the driver) and not be obstructed by steering wheel 24 or camera 30. Movement of driver 82's eyes 83*a* and 83*b* up and down may be measured by camera 30. Further, such movement may be inferred if the position of a vertical adjuster of driver 82's seat is known, provided that such a vertical adjuster and a sensor to sense the adjuster's position are provided. Given that the positions of driver 82's eyes 83*a* and 83*b* and the position of steering wheel 24 are known, similar geometric principles to those previously described are used to calculate the shifted position of some or all of images 44 or image field 46 as a whole.

If driver 82's eyes 83*a* and 83*b* move lower, images 44 as viewed by the driver will tend to shift down relative to aperture 70 of steering wheel 24. Accordingly, the system may shift some or all of images 44 or image field 46 as a whole upward in order to coincide in driver 82's field of vision with aperture 70 (as viewed by the driver) and not be obstructed by steering wheel 24 or camera 30.

If steering wheel 24 is adjusted upward, images 44 as viewed by the driver will shift downward relative to aperture 70 of steering wheel 24. Accordingly, the system may shift some or all of images 44 or image field 46 as a whole upward in order to coincide in driver 82's field of vision with aperture 70 and not be obstructed by steering wheel 24 or camera 30.

If steering wheel 24 is adjusted downward, images 44 as viewed by the driver will shift upward relative to aperture 70 of steering wheel 24. Accordingly, the system may shift some or all of images 44 or image field 46 as a whole downward in order to coincide in driver 82's field of view with aperture 70 and not be obstructed by steering wheel 24 or camera 30.

If steering wheel 24 is tilted upward, images 44 as viewed by the driver will generally shift downward relative to aperture 70 of steering wheel 24. Accordingly, the system may shift some or all of images 44 or image field 46 as a whole upward in order to coincide in driver 82's field of view with aperture 70 and not be obstructed by steering wheel 24.

If steering wheel 24 is tilted downward, images 44 as viewed by the driver will shift upward relative to aperture 70 of steering wheel 24. Accordingly, the system may shift some or all of images 44 or image field 46 as a whole downward in order to coincide with aperture 70 (as viewed by the driver) and not be obstructed by steering wheel 24.

If steering wheel 24 is adjusted to be farther from driver 82, this situation is illustrated with reference to FIG. 9. Steering wheel 24 in its initialized position and in a position 24' adjusted farther from driver 82 are shown there. Whereas, as initialized, the field of view 84 of driver 82 coincided with the width of aperture 70 and the width W of image field 46, driver 82's view of the edges of image field 46 will now be obstructed by repositioned aperture 70'. Thus, the system disclosed herein may reduce in size some or all of images 44 or image field 46 as a whole so that they continue to be visible through aperture 70 of steering wheel 24 if steering wheel 24 is in position 24'.

It can be shown that the width W of image field 46 that will cause the width W to coincide with driver 82's field of view 84 through aperture 70 in steering wheel 24 is represented by the following equation:

$$W = \frac{ad}{d-b}$$

where d is the distance of driver 82's eyes 83*a* and 83*b* from instrument panel display 22, a is the width of aperture 70 in steering wheel 24 and b is the distance of steering wheel 24 from instrument panel display 22. Thus, it is clear that as b gets smaller, the denominator of the above fraction gets larger, and W gets smaller. That is, as steering wheel 24 is moved away from the driver and toward instrument panel display 22, the width of image field 46 may be reduced in size in accordance with the above equation in order to be fully visible through aperture 70 in steering wheel 24.

It can additionally be shown that as steering wheel 24 moves toward instrument panel display 22, W reduces as $$\Delta W = \frac{ad\Delta b}{(d-b)(d-b+\Delta b)}$$

where Δb is the change of distance of steering wheel 24 from instrument panel display 22 and ΔW is the corresponding change in the width of image field 46 so that images 44 may continue to be seen unobstructed by steering wheel 24. That is, given a known a (width of aperture 70), b (distance of steering wheel 24 from instrument panel display 22) and d (distance of driver 82's eyes 83*a* and 83*b* from instrument panel display 22), movement Δb of steering wheel 24 toward instrument panel display 22 should be accompanied by a reduction ΔW in the width of image field 46 so that images 44 may continue to be seen by driver 82 in an unobstructed fashion.

If driver 82's eyes 83*a* and 83*b* move farther from instrument panel display 22, the situation is basically akin to the situation where steering wheel 24 is adjusted to be farther away from driver 82. The edges of image field 46 will tend to be obstructed by steering wheel 24. As such, some or all of images 44 or image field 46 as a whole may be made smaller by the system disclosed herein in order to be viewable by driver 82 in aperture 70 at least substantially without obstruction.

The distance of the position of driver 82's eyes 83*a* and 83*b* from instrument panel display 22 may be measured by camera 30's sensing driver 82's eye position. "Eye position" as referred to in this disclosure may be the position of either of the driver 82's eyes 83*a* or 83*b* or a composite that represents, say, the midpoint between the sensed positions of eyes 83*a* and 83*b*. As previously discussed, eye position may be sensed in three dimensions by camera 30. Alternatively and to the extent that the fore-aft position of driver 82's seat is monitored via a sensor, the distance of driver 82's eyes 83*a* and 83*b* from instrument panel display 22 may be inferred by the fore-aft position of the driver seat.

Figure 9:
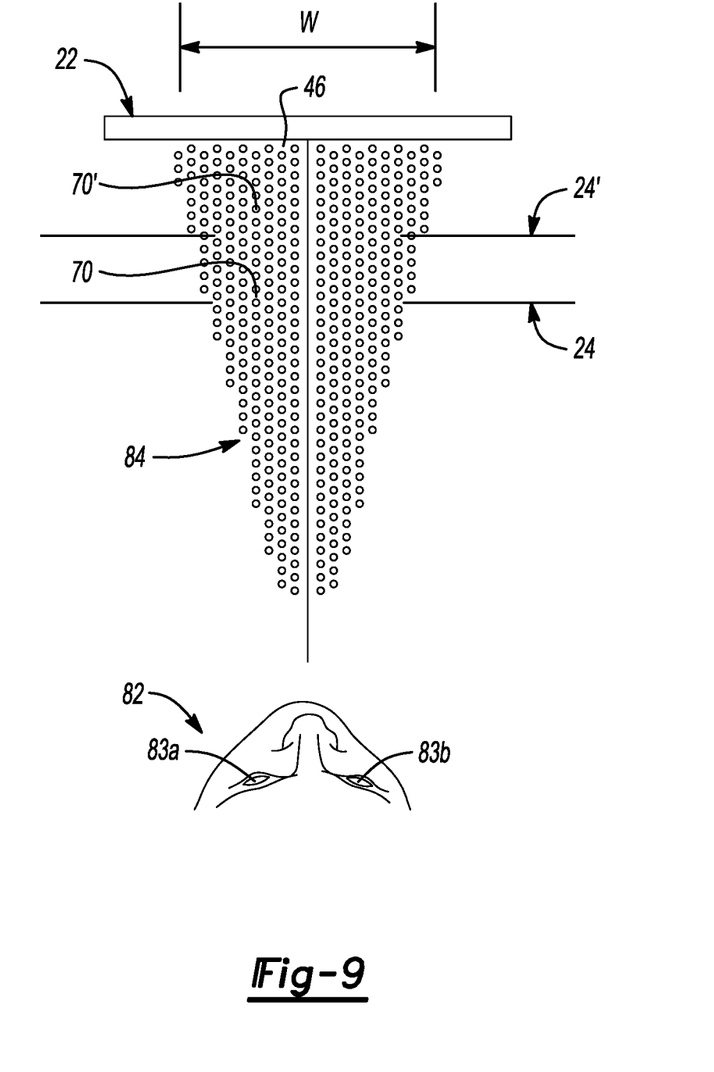
FIG. 9 shows a top view of the vehicle operator viewing the instrument panel display if steering wheel of the vehicle has moved closer to the instrument panel display.

If steering wheel 24 is adjusted to be closer to the driver, the situation of FIG. 9 is reversed. Driver 82 will have a wider unobstructed field of view through aperture 70. If desired, some or all of images 44 or image field 46 as a whole may be enlarged for better readability by the driver without at the same time being obstructed by steering wheel 24.

If driver 82's eyes 83*a* and 83*b* move closer to instrument panel display 22, driver 82's unobstructed field of view through aperture 70 will become wider, generally akin to the situation where steering wheel 24 is adjusted to be closer to the driver. This should not cause an obstruction issue with driver 82's vision of images 44. However, it may be an opportunity to enlarge some or all of images 44 or image field 46 as a whole to more fully fill aperture 70, and images 44 or image field 46 as a whole may be so enlarged by the system disclosed herein. The larger images 44 would be easier to see.

If, because the driver has moved so far from instrument panel display 22 or steering wheel 24 has been adjusted so far from the driver that some images 44 or image field 46 cannot be sized to fit within aperture 70 (as viewed by the driver) and still be large enough to be readable, some or all of images 44 may be relocated relative to other of images 44 on instrument panel display 22 so images 44 as a whole, as relocated, are visible to the driver on instrument panel display 22 without obstruction. Alternatively or additionally, some of images 44 may be relocated by displaying them on an alternative display in the vehicle, such as center stack display 31 or heads-up display 35.

The physical shape and dimensions of steering wheel 24 (including aperture 70) and camera 30 may be stored in memory in ECU 100 when the vehicle is built. This would allow ECU 100 to perform the geometric calculations, using the initialized position of driver 82's eyes 83a and 83b and steering wheel 24, to adjust images 44 or image field 46 on instrument panel display 22 as driver 82's eyes 83a and 83b and/or steering wheel 24 change position, as described herein. Alternatively, look-up tables may be used to store the preferable positions and sizes of images 44 and/or image field 46 as a function of driver eye position and steering wheel position so images 44 may be moved and/or resized to be fully visible to driver 82 as driver 82's eyes 83a and 83b and/or steering wheel 24 change position.

In an alternative step that may be performed during the initialization of instrument panel display 22 disclosed herein, some of images 44 may be repositioned to an alternative display, such as center stack display 31 or heads-up display 35, if even during initialization not all of images 44 or image field 46 may be resized and/or repositioned to be visible without obstruction by steering wheel 24 or camera 30.

There may be additional visual obstructions that may impede driver 82's view of portions of instrument panel display 22. Such obstructions may include turn signal, windshield wiper control, and transmission shifter stalks extending from the steering column of the vehicle, as well as gear shift paddles that may obstruct driver 82's view of instrument panel display 22. The system and method of the present disclosure may be equally effective in reducing the impact of those additional obstructions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. For instance, while the example disclosure provided herein shows the teachings hereof in the environment of a motor vehicle, these teachings are not so limited. Moreover, this disclosure expressly includes combinations and sub-combinations of the elements and features presented above and below.

What is claimed is:

1. A method for presenting one or more images to an observer on a reconfigurable electronic display, the method comprising:
   prompting the observer to select a portion of the display that is visible to the observer;
   if the observer has selected a portion of the display, presenting the one or more images to fit within the selected portion of the display; and
   subsequent to the presenting the one or more images to fit within the selected portion of the display and in response to at least partial obstruction of the observer's view of the one or more images by a visual obstruction, reconfiguring the one or more images to be fully visible to the observer notwithstanding the visual obstruction.

2. The method of claim 1, wherein the prompting the observer comprises:
   presenting a first pattern of polygons on the display; and
   requesting the observer to select polygons, from the first pattern of polygons, that are fully visible to the observer.

3. The method of claim 2, wherein the prompting the observer further comprises:
   if the observer has selected polygons from the first pattern of polygons, presenting a second pattern of polygons on the display, the polygons of the second pattern of polygons being smaller than the polygons of the first pattern of polygons and situated in a portion of the display not selected by the observer from the first pattern of polygons; and
   requesting the observer to select polygons, from the second pattern of polygons, that are fully visible to the observer.

4. The method of claim 1, wherein the reconfiguring the one or more images comprises resizing the one or more images on the display.

5. The method of claim 1, wherein the reconfiguring the one or more images comprises moving the one or more images on the display.

6. The method of claim 1, wherein the observer is a driver of a motor vehicle.

7. The method of claim 6, wherein the visual obstruction is a steering wheel of the vehicle or a portion of the steering wheel.

8. The method of claim 6, wherein the one or more images comprise at least one of an image of a speedometer of the motor vehicle, an image of a transmission gear indicator of the motor vehicle, an image of a fuel level gauge of the motor vehicle, an image of a coolant temperature gauge of the motor vehicle, and an image of a telltale indicator lamp of the motor vehicle.

9. The method of claim 1, further comprising:
   if the one or more images cannot be reconfigured to be fully visible notwithstanding the visual obstruction, displaying the one or more images on a second display.

10. The method of claim 9, wherein the display is an instrument panel display of the vehicle and the second display is a heads-up display or a center stack display of the vehicle.

11. The method of claim 1, wherein the prompting the driver comprises providing the observer with a cursor and requesting the observer to identify, with the cursor, a portion of the display that is visible to the observer.

12. A method for presenting one or more images to an observer on a reconfigurable electronic display, the method comprising:
   prompting the observer to select a portion of the display that is visible to the observer; and
   if the observer has selected a portion of the display, presenting the one or more images to fit within the selected portion of the display;
   subsequent to presenting the one or more images to fit within the selected portion of the display, monitoring one or more of an eye position of the observer relative to the one or more images and a position of an object generally located between the observer and the one or more images to determine whether the object partially or wholly obstructs the observer's view of the one or more images; and if the object partially or wholly obstructs the observer's view of the one or more images, reconfiguring the one or more images to be fully visible to the observer.

13. The method of claim 12, wherein the prompting the observer comprises:

presenting a first pattern of polygons on the display; and requesting the observer to select, from the first pattern of polygons, polygons that are fully visible to the observer.

14. The method of claim 13, wherein the prompting the observer further comprises:

if the observer has selected polygons from the first pattern of polygons, presenting a second pattern of polygons on the display, the polygons of the second pattern of polygons being smaller than the polygons of the first pattern of polygons and situated a portion of the display not selected by the observer from the first pattern of polygons; and requesting the observer to select, from the second pattern of polygons, polygons that are fully visible to the observer.

15. The method of claim 14, wherein the reconfigurable electronic display is an instrument panel display of a vehicle.

16. A reconfigurable display system for displaying one or more images thereon, the system comprising:

a reconfigurable electronic display;

one or more electronic control units collectively programmed with the following instructions which, when executed by the one or more electronic control units, cause the one or more electronic control units to:

prompt an observer to select a portion of the display that is visible to the observer;

if the observer has selected a portion of the display, present the one or more images to fit within the selected portion of the display; and subsequent to presenting the one or more images to fit within the selected portion of the display and in response to at least partial obstruction of the observer's view of the one or more images by a visual obstruction, reconfigure the one or more images to be fully visible to the observer notwithstanding the visual obstruction.

17. The reconfigurable display system of claim 16, wherein the instruction to prompt the observer further comprises the following instructions which, when executed by the one or more electronic control units, cause the one or more electronic control units to:

present a pattern of polygons on the display; and request the observer to select, from the pattern of polygons, polygons that are fully visible to the observer.

18. The reconfigurable display system of claim 17, wherein:

the observer is a driver of a motor vehicle; and the display is an instrument panel display of the motor vehicle; and the visual obstruction is a steering wheel of the motor vehicle or a portion of the steering wheel of the motor vehicle.

19. The reconfigurable display system of claim 18, wherein the instruction to reconfigure the one or more images includes an instruction which, when executed by the one or more electronic control units, causes the one or more electronic control units to to move or resize the one or more images.

20. The reconfigurable display system of claim 16, wherein the instruction to reconfigure the one or more images includes an instruction which, when executed by the one or more electronic control units, causes the one or more electronic control units to to move or resize the one or more images.

* * * * *